United States Patent
Green et al.

(10) Patent No.: US 11,986,916 B2
(45) Date of Patent: May 21, 2024

(54) HIGH-PRECISION KICKBACK DETECTION FOR POWER TOOLS

(71) Applicant: Lantern Holdings, LLC, Sterling, VA (US)

(72) Inventors: Chad Thomas Green, Ashburn, VA (US); Ty Batchelor, Decatur, AL (US); Destin Sandlin, Hartselle, AL (US)

(73) Assignee: LATERN HOLDINGS, LLC, Sterling, VA (US)

( * ) Notice: Subject to any disclaimer, the term of this patent is extended or adjusted under 35 U.S.C. 154(b) by 628 days.

(21) Appl. No.: 16/878,975

(22) Filed: May 20, 2020

(65) Prior Publication Data

US 2020/0276680 A1    Sep. 3, 2020

Related U.S. Application Data

(63) Continuation of application No. PCT/US2019/018967, filed on Feb. 21, 2019.
(Continued)

(51) Int. Cl.
*B23Q 11/00*    (2006.01)
*G06N 20/00*   (2019.01)
(Continued)

(52) U.S. Cl.
CPC ......... *B23Q 11/0092* (2013.01); *G06N 20/00* (2019.01); *H02K 7/14* (2013.01);
(Continued)

(58) Field of Classification Search
USPC .......................................... 173/179
See application file for complete search history.

(56) References Cited

U.S. PATENT DOCUMENTS

2005/0057206 A1    3/2005  Uneyama
2007/0084613 A1*   4/2007  Zhang .................... B25B 21/00
                                                    173/1
(Continued)

FOREIGN PATENT DOCUMENTS

DE    10 2004 046 000 A1    3/2006
EP         1 398 119 A1    3/2004

OTHER PUBLICATIONS

Office Action issued in German Application No. 112019000228.7 dated Jun. 7, 2021 with an English Translation.
(Continued)

*Primary Examiner* — Paul D Lee
(74) *Attorney, Agent, or Firm* — BIRCH, STEWART, KOLASCH & BIRCH, LLP (57) ABSTRACT

A high-precision, low false alarm rate detection apparatus, system, and method for rapid reaction to sudden kinetic impulses caused by abnormal motion, such as kickback, of a power tool. The apparatus, system and method includes local measurement of sensing modalities with local real-time processing and advanced digital signal processing to measure the total kinematic motion of any power tool. A machine learning model pre-trained for the power tool to predict an occurrence of an abnormal motion such as a kickback event of the power tool, the machine learning model using data received from sensing modalities to predict an occurrence of the kickback event, and a reactive device of the power tool is activated upon prediction of the kickback event.

13 Claims, 4 Drawing Sheets

Related U.S. Application Data (60) Provisional application No. 62/633,305, filed on Feb. 21, 2018.

(51) Int. Cl.
| | | |
|---|---|---|
| *H02K 7/14* | (2006.01) | |
| *H02K 11/21* | (2016.01) | |
| *B23D 59/00* | (2006.01) | |
| *G01P 3/36* | (2006.01) | |
| *G01P 3/44* | (2006.01) | |
| *G01P 15/18* | (2013.01) | |
| *G05B 19/406* | (2006.01) | |

(52) U.S. Cl.
CPC .......... *H02K 11/21* (2016.01); *B23D 59/001* (2013.01); *G01P 3/36* (2013.01); *G01P 3/44* (2013.01); *G01P 15/18* (2013.01); *G05B 19/406* (2013.01)

(56) References Cited

U.S. PATENT DOCUMENTS

| | | | |
|---|---|---|---|
| 2014/0053419 | A1* | 2/2014 | Leh ................... B23D 51/16 30/392 |
| 2015/0127272 | A1 | 5/2015 | Sundquist |
| 2015/0293523 | A1 | 10/2015 | Yamamoto et al. |
| 2016/0342151 | A1 | 11/2016 | Dey, IV et al. |
| 2017/0069144 | A1 | 3/2017 | Lawrie-Fussey et al. |
| 2017/0272842 | A1 | 9/2017 | Touma et al. |
| 2017/0361449 | A1* | 12/2017 | Goble ................ G01C 19/08 |
| 2019/0227528 | A1* | 7/2019 | Abbott ............... G05B 19/4155 |
| 2021/0059649 | A1* | 3/2021 | Hunt .................. A61B 17/1626 |

OTHER PUBLICATIONS

Swedish Office Action and Search Report for Swedish Application No. 2050821-4, dated May 26, 2021.

* cited by examiner

FIG. 4

HIGH-PRECISION KICKBACK DETECTION FOR POWER TOOLS

CROSS REFERENCE TO RELATED APPLICATIONS

This application is a Continuation of PCT International Application No. PCT/US2019/018967 filed on Feb. 21, 2019, which claims priority under 35 U.S.C. § 119(e) to U.S. Provisional Application No. 62/633,305 filed on Feb. 21, 2018, all of which are hereby expressly incorporated by reference into the present application.

BACKGROUND

This specification relates to integrating machine learning into a motion detection system for power tools.

In operation, power tools can be dangerous for users, especially when unwanted abnormal and unexpected motion from the power tools occur. Abnormal motion includes any relative motion between the user and the power tool that may create contact between any portion of the user and any dangerous surface of the power tool causing impingement, laceration, or otherwise physical harm the user. For example, a user may experience kickback from a power tool. Kickback is a sudden unexpected forceful recoil from a power tool that occurs during use. This movement often happens when a moving blade of the power tool gets bound or pinched in a workpiece causing the power tool to lurch back toward the power tool user's body. Additionally, a user may unintentionally contact a hazardous surface of any power tool as a result of fatigue or distraction.

Although abnormal relative motion between power tools and users can be extremely hazardous to users, distinguishing between regular motion and uncharacteristic motion of a power tool relative to the user with an acceptable false rate is often very difficult.

SUMMARY

This specification describes technologies relating to power tool safety in general, and specifically to a high-precision, low false alarm rate detection apparatus, system, and method for rapid reaction to abnormal relative motion between a power tool and user, including sudden kinetic impulses caused by abnormal motion of a power tool. These technologies generally involve systems for measuring the total kinematic motion of any power tool, using a machine learning model to determine whether abnormal motion has occurred given particular kinematic motion for a power tool, and engaging a reactive interlock when the machine learning model determines that abnormal relative motion has occurred to inhibit further uncharacteristic motion from the power tool.

In general, one innovative aspect of the subject matter described in this specification can be embodied in a high-precision, low false alarm rate detection apparatus, system, and method for rapid reaction to sudden kinetic impulses caused by abnormal motion, such as kickback, of a power tool.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

The foregoing and other embodiments can each optionally include one or more of the following features, alone or in combination. In particular, one embodiment includes all the following features in combination. A multi-dimensional abnormal motion detection system for abnormal motion detection of a power tool comprises: a three-axes accelerometer sensor; a three-axes gyroscope sensor; a three-axes magnetometer sensor; and a processor comprising a machine learning model trained per power tool to determine abnormal motion for the power tool. The machine learning model uses data received from the accelerometer, gyroscope, and magnetometer to determine whether motion of the power tool is abnormal. The abnormal motion detection system can further comprise: one or more flow-rate sensors and one or more ranging sensors for quantifying relative motion between the power tool and a workpiece. The machine learning model additionally uses one or more flow-rate sensors and ranging sensor data to determine whether motion of the power tool is normal. Thus, the sudden changes in torque, or the rotation rate of the motor or blade, create large magnetic fields which can be measured by an electromagnetic sensor, for example, a magnetometer. In some implementations, the abnormal motion detection system further comprises a presence or rotational rate detector for an output element of the power tool. The machine learning model additionally uses presence or rotational rate data to determine whether motion of the power tool is normal. In an implementation, the abnormal motion detection system further comprises one or more sensors positioned on the user and/or tool that measures relative motion between the power tool and user.

In some implementations, the processor of the abnormal motion detection system collects, timestamps, and loads data from all sensors into short-term memory for further processing and, after processing, compresses and moves the sensor data to long-term memory. The processing can include using sensor fusion algorithms that combine multiple sensor streams to describe total motion of the power tool into unified frames. Additional filtering and digital signal processing can remove noise using at least one of: frequency domain analysis, adaptive filtering techniques, and Kalman filters tuned to physical, holonomic constraints of the power tool while the tool is in operation.

The output of filtering and digital signal processing can be categorized into multi-dimensional unified frames in one implementation. The digital signal processing can include inference using a pre-trained recurrent or convolutional neural network, support vector machine, or regression techniques, to enable rapid detection of an abnormal power tool event. An abnormal power tool event can be announced through an electrical, acoustic, optical, or electro-mechanical signal to a mitigating reactive device in order to stop, slow, or inhibit the abnormal power tool event.

An electronic active or passive device can assign or register one or more users associated with one or more specific tools before operation of that tool is possible by the user. The electronic active or passive device may be a mobile device with wireless connectivity and user proximity may be established with the mobile device running a mobile application for power tool safety.

In one implementation, the power tool is disabled when the mobile device running the mobile application for power tool safety is not in proximity to the abnormal motion detection system.

In one implementation, anonymous time series data collected through use of the power tool is transmitted using the mobile device running the mobile application for power tool safety to a cloud-based deep-learning machine learning model and used to improve detection of future hazardous conditions.

In an implementation, the mobile application for power tool safety issues an alert to nearby co-workers or first responders if the power tool user does not acknowledge the mobile alert and re-enable the power tool.

In some implementations, the abnormal motion detection system includes a digital signal processor that contains the machine learning model as a neural network, a memory storage device, a general purpose I/O, wireless connectivity, at least one environmental sensor, a battery, and a battery charger.

Another implementation is a method that receives sensor data from multiple sensors in a workspace, the sensor data including data from measuring motion of a power tool in three dimensions. The received sensor data is processed using at least one filter to remove unnecessary noise from the received sensor data and at least one sensor fusion algorithm to combine the sensor data to create unified frames of data. The unified frames of data are processed using a machine learning model trained to determine abnormal power tool motion to generate an output determining whether motion of the power tool is normal. The output is then provided to a reactive device. The machine learning model may be pre-trained on labeled training data that is generated when a user uses a power tool in one or more training scenarios. The training data may be labeled as normal when no abnormal motion events occur during motion capture. The training data may be labeled as abnormal and manually annotated with a timestamp of an exact event when an abnormal event occurs.

The subject matter described in this specification can be implemented in particular embodiments so as to realize one or more of the following advantages.

Unlike conventional systems that only measure motion in 3 or 6 degrees of freedom, the abnormal motion detection system of this specification includes an accelerometer, a gyroscope, and a magnetometer to create a nine degrees of freedom system in which acceleration, rotation, and magnetic flux (proportional to rotational rate or torque of the electric saw) can be measured simultaneously in all three axes, e.g., roll, pitch, and yaw. By measuring data in nine degrees of freedom, the system provides a higher degree of precision when detecting abnormal motion and leads to fewer false positives than conventional systems.

The abnormal motion detection system couples local measurement of these multiple sensing modalities with local, real-time processing to calculate the total kinematic motion of a power tool while the tool is in use. The total kinetic energy of the system is the sum of linear motion as well as rotational motion in all six degrees of freedom of the power tool in three-dimensional space.

The abnormal motion detection system can also measure the flow-rate of material passing the cutting or drilling device of power tools, e.g. when detecting table saw motion. The system can measure the 3-dimensional relative motion of a power tool and material using one or more optical flow sensors and ranging sensors. This measurement can help detect abnormal motion of the power tool from the workpiece. The system can then immediately sense the hazard and send information to a controller of mitigating technology to stop or significantly slow the energy transfer from the power tool to the workpiece. The abnormal motion detection system can also measure relative motion between the power tool and user by using a suite of user-mounted and/or tool mounted sensors comprising such sensors as depth cameras, inertial measurement units, and stereoscopic cameras.

The system uses sensor fusion algorithms to combine the multiple sensor modalities, each measured concurrently in three-dimensional space, and calculate true relative motion between power tools and their respective workpieces.

Using a neural network that is trained on labeled training data to differentiate normal from abnormal power tool motion, the system can identify uncharacteristic or undesirable motion of a power tool from real-time usage data gathered while the tool is operating. The system can also capture data, such as motion profiles under various conditions, i.e., time of day, temperature, humidity, continuous hours of usage, etc. In an offline process, the system can run this captured data through deep learning algorithms to refine risk assessments for power tools and use the refined deep learning algorithms to determine trends which may help predict high-risk usage scenarios and refine the deployed neural network models to predict abnormal motion given certain usage scenarios.

Other kickback detection solutions exist, but none use all three modalities: acceleration, rotation, as well as the auxiliary sensors (torque, flow rate, or rotation of the cutting implement). Without all three modalities, normal or aggressive tool operation such as vibration through rough material, rotation during plunge operations, or common shaking and banging that occurs on the job site, may be easily mistaken for kickback thus creating a false alarm. Additionally, the plethora of different modes of operation make hard-coding fixed algorithms that accommodate each of the varying scenarios very challenging. The machine learning method of the present invention offers more flexibility in detecting kickback in a larger variety of operational scenarios. It also allows for continuous improvement of the detection algorithms as more and more data is collected for future training. The predictive neural network runs in real-time on the device and predicts imminent kickback events, providing additional time for hazard mitigation measures to be applied. This predictive functionality is not possible in existing kickback detection solutions. Since the system can only fail safe, it does not present any additional hazard beyond normal use of the tool without the kickback detector. Therefore, the embodiments of the present invention exceed the performance of existing technology in both early intervention, as well as improved false alarm rate and higher probability of detection.

In addition to rapid detection and prediction of uncharacteristic or undesirable motion, the abnormal motion detection system can optionally include a mobile application that contains profiles for users of power tools. These user-specific profiles help the abnormal motion detection system identify power tool owners and determine between typical usage of a particular power tool for a user and non-characteristic hazardous conditions. The system can also use the mobile application to alert others to problems if severe abnormal motion is detected.

The system may also include wireless connectivity, a memory storage device, a general purpose I/O, an environmental sensor, a battery, and a battery charger to create a safety system that integrates into a power tool or can be added to a power tool.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The specification generally describes an abnormal motion detection system that dynamically detects abnormal motion of a power tool in a workspace.

As used in this specification, the term "power tool" refers to any tool with one or more moving parts that are moved by an actuator, such as an electric motor, an internal combustion engine, a hydraulic or pneumatic cylinder, and the like. For example, power tools include, but are not limited to: bevel saws, miter saws, table saws, circular saws, reciprocating saws, jig saws, band saws, cold saws, cutter, impact drivers, angler grinders, drills, jointers, nail drivers, sanders, trimmers, and routers.

Additionally, as used in this specification, the term "implement" refers to a moving part of the power tool that is at least partially exposed during operation of the power tool. Examples of implements in power tools include, but are not limited to: rotating and reciprocating saw blades, drill bits, routing bits, grinding disks, grinding wheels, and the like.

The abnormal motion detection system improves conventional power tool motion detection systems by providing high-precision accuracy and low false positive results using a machine learning model to determine abnormal motion for power tools.

Conventional systems detect abnormal motion in power tools using accelerometers or gyroscopes, which the systems use to measure acceleration or rotation in one or more axes of power tools. These customary systems compare the measured values against a predetermined threshold and trip a circuit when the threshold is reached. Tripping the circuit engages a reactive device that reacts to the abnormal motion, e.g. cuts power or applies a brake.

However, these customary single-sensor modality systems do not fully characterize the motion of power tools and are prone to false alarms generated by characteristic vibration and rotation as well as incorrect or ambiguous measurements due to limitations in the sensing approach.

Since many power tools generate a very large amount of vibration, the threshold must not be set very high such that true abnormal motion events, i.e., kickbacks, are indistinguishable from vibratory noise or detected too late. Conversely, if the threshold is set too low, conventional systems generate too many false positives during normal, safe use, and discourage users from engaging the abnormal motion safety feature. Additionally, most conventional systems use sensing modalities that are limited to less than six degrees of freedom which means that some motion may not be detected, leading to dangerous false negative results on abnormal motion detection.

For example, when used independently, neither a 3-axis accelerometer, nor a 3-axis gyroscope can measure absolute motion. An accelerometer is capable of measuring linear acceleration in three dimensions (including gravitational acceleration), but the sensor has difficulty accurately measuring rotation in all axes. Similarly, a gyroscope measures rotation about each axis, but is insensitive to linear motion along those axes. The combination of the two sensors creates a six degree of freedom system where acceleration and rotation are measured simultaneously in all three axes. Yet, the fusion of all three axes is very challenging especially when each sensor is packaged discreetly with an offset between the axes of the accelerometer and gyroscope.

Figure 1:
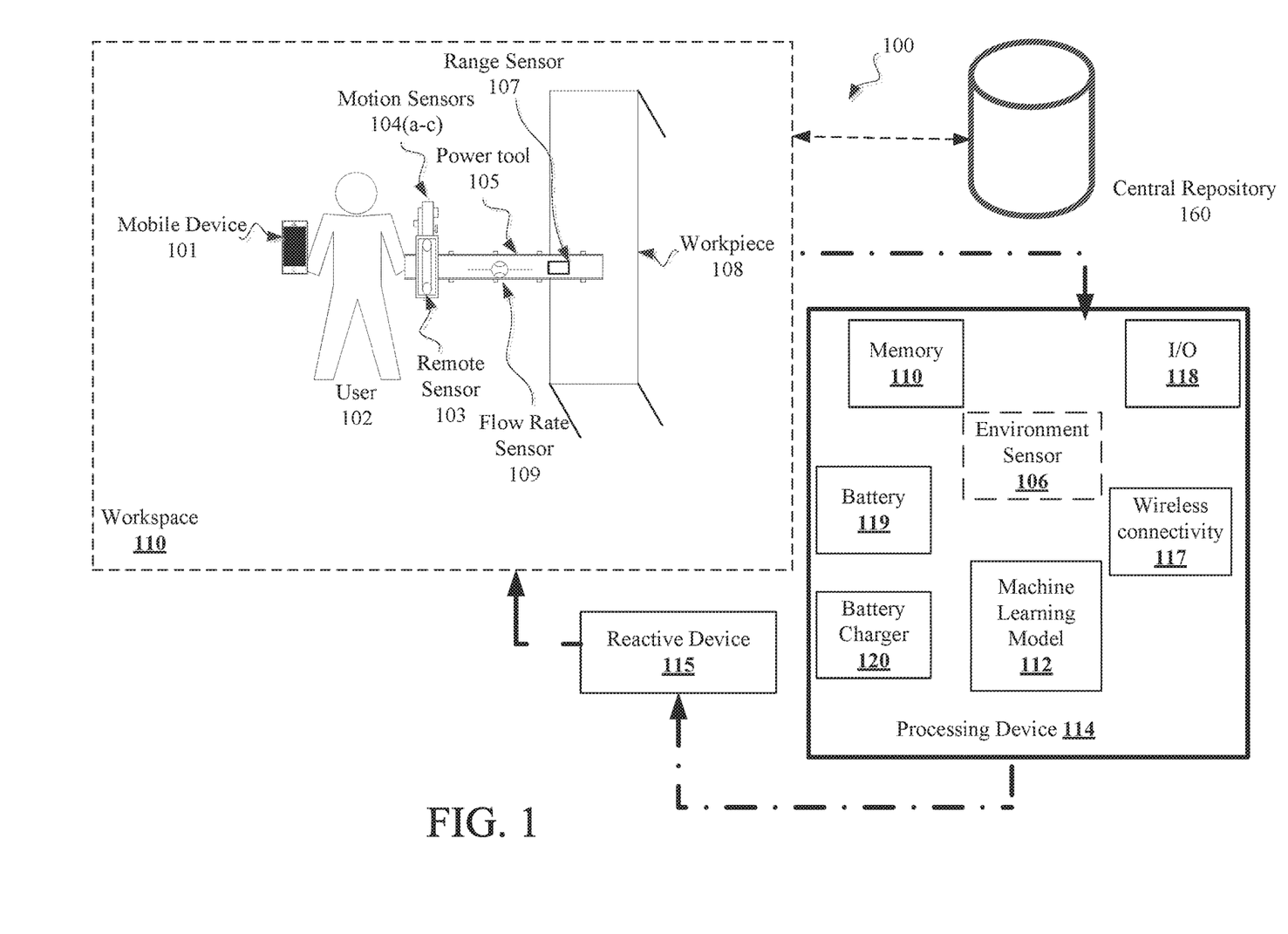
FIG. 1 illustrates an abnormal motion detection system that dynamically determines whether motion of a power tool in a workspace is abnormal.

An example of an abnormal motion detection system, as illustrated in FIG. 1, determines whether detected power tool motion is normal given specific sensor data, e.g., data from the power tool itself, and optionally, data from the user and/or from external sensors. The system measures multiple sensing modalities in three-dimensions to calculate the total kinematic motion of a power tool while in use. The system also uses sensor fusion algorithms to combine the sensor modalities and calculate true relative motion between a power tool, workpiece, and user. The system then runs inference on a pre-trained neural network to determine if the sensed motion from the power tool is desirable or undesirable for the particular power tool.

In some implementations, the system can pre-train the neural network on user-specific data to determine whether sensed motion from the power tool is normal or abnormal based on the specific user who is using the tool. In other implementations, the system pre-trains the neural network on training data collected from multiple users that generically shows normal and abnormal tool motion.

FIG. 1 illustrates an example abnormal motion detection system 100 that dynamically determines whether motion of a power tool 105 in a workspace 110 is abnormal. The abnormal motion detection system 100 is an example of a system implemented as computer programs on one or more computers in one or more locations, in which the systems, components, and techniques described below can be implemented.

In some implementations, the abnormal motion detection system 100 can prevent use of the power tool 105 prior to a registered user 102 being present to use the tool by having its default state as powered-off.

One or more electronic active or passive wireless proximity devices may be used to assign or register one or more users associated with one or more specific tools before operation of that tool is possible by the user. Such a device may include a mobile electronic key fob or a mobile application on a phone or other device to register a user as an owner or as associated with the tool. In some embodiments such devices may allow one or more users to operate the tool only if the proximity device is keyed to the specific user to use one or more specified tools. A processing device 114 inside, or otherwise associated with, the tool can have wireless connectivity 117, e.g., Bluetooth, to communicate with an electronic device, for example a smartphone. In one embodiment a mobile phone and application are used and in some implementations, the phone is registered to the tool by having a user log into the application and associate the tool with the phone. Once the tool is associated with the phone in the registration process, the tool can act as a Bluetooth beacon.

The system 100 can then use a mobile application running on the user's associated mobile device 101 to determine when the owner of the tool or another person associated with the tool is operating the tool. When the tool detects a registered user's phone within a pre-determined proximity, the tool can unlock itself. This mobile application feature is optional and not required in every implementation of the abnormal motion detection system and may not be used at all. Further, the features of the mobile application are not limited to use on a mobile application and can be implemented in any type of device that allows for communication via wireless connectivity that allows for syncing one or more users to a specific tool and activation of the tool.

As illustrated in FIG. 1, the abnormal motion detection system 100 monitors motion of a power tool 105 while in use by a user 102 and gathers sensor data from multiple sensors, e.g., sensor 103, 104, 106, 107, and 109, in a workspace 110 of a user 102 using a power tool 105 on a workpiece 108.

Motion sensors 104 can be located in the main sensor housing of a power tool 105. These motion sensors can include an accelerometer 104a, a gyroscope 104b, and a magnetometer 104c. The motion sensors 104 may also include a barometer for elevation measurement. The motion sensors 104 may additionally include temperature and humidity sensors. One or more of the sensors senses in three orthogonal axes, X (roll), Y (pitch), and Z (yaw).

In one embodiment, the motion sensors 104 can be on a single chip that is placed in or on the power tool 105. In some implementations, these sensors are collocated in the single chip. The chip can be on a circuit board that typically fits in the handle and interfaces with the trigger electronics of a power tool. For example, the abnormal motion detection system 100 can use a sensor chip that has a fully integrated multi-modal, multi-axis sensors with embedded sensor fusion algorithms in a single chip. This chip has a nine degree of freedom sensor using a 3-axis accelerometer, a 3-axis gyroscope, and a 3-axis magnetometer with an integrated processor and a pre-programmed sensor fusion algorithm. However, any comparable sensor chip may be used in the embodiments of the invention.

Using the motion sensors 104, the abnormal motion detection system 100 can calculate the total kinematic motion of a power tool 105 while the tool is in use. Total kinetic motion refers to the sum of linear motion as well as rotational motion in all six axes. Sensor fusion algorithms combine multiple sensor modalities, each measured concurrently in three-dimensional space, so that the system can calculate true relative motion between a power tool 105 and a workpiece 108.

Remote sensors 103 are sensors that can be placed on the tool, for example, near a chain, blade, guide or a motor of the power tool 105, and may be separate from the motion sensors in the sensor chip. For some tools with no electric field on a motor, i.e., a gas-powered chainsaw, an additional hall-effect sensor may be placed near the chain to detect rotation. In some implementations, the remote sensors 103 include an extra accelerometer on a motor of the power tool to detect inherent vibration due to the motor, which is subtracted from the overall tool motion.

An environment sensor 106 is a sensor providing information about the workspace 110 environment. The system 100 may have at least one environment sensor 106 that provides information that may include, but is not limited to, time, temperature, ambient light, and humidity. Environment sensors 106 can alternatively or additionally include geo-locating sensors such as GPS, NFC, WIFI, and/or cellular tower triangulation. Environmental sensors can also be located on the power tool.

A workpiece range meter sensor 107, e.g., a mechanical range detector, an ultrasonic range detector, or one of many optical ranging devices can be placed on a power tool 105 or optical fiducials can be placed on a workpiece 108 to gather range data. Ranging sensors may be tool-specific and whichever ranging sensor a particular tool requires can be mounted to the tool, looking at or touching the workpiece. For example, a mechanical ranging sensor may be a plunger or a whip switch. An optical ranging sensor may be a time-of flight ranger, triangulation through reflectance, or a continuous-wave phase detector. Optical fiducials are stickers that a user can stick to a workpiece and a camera on the tool can focus on the sticker to measure flow rate.

One or more workpiece flow rate sensors 109, e.g., a magnetic flow-rate sensor, ultrasonic flow-rate sensor, RF flow-rate sensor, capacitive flow-rate sensor, mechanical flow-rate sensor (e.g., trackball), or an optical flow-rate sensor similar to what is commonly found in an optical mouse placed on a power tool 105 or other optical method using optical fiducials placed on the workpiece. This workpiece flow rate sensor 109 measures the flow-rate of material passing the cutting or drilling power tool 105. Using an optical flow sensor as well as a common IR proximity sensor, the system 100 can measure the three-dimensional relative motion of the tool and material.

One or more flow-rate sensors can also be used in a fixed-tool application, such as a table saw. For example, an optical sensor can be positioned on the underside of a table saw looking up at the workpiece. Sensors can be placed in several locations on either side of the saw blade, watching the motion of the material passing in close proximity. If the material accelerates too quickly in the plane of the table, or lifts up too quickly off the surface of the table, the system can determine that the material has been caught in the blade and is being ejected by the tool. In these instances, the system can alert a reactive device 115 to quickly stop the blade.

Figure 2:
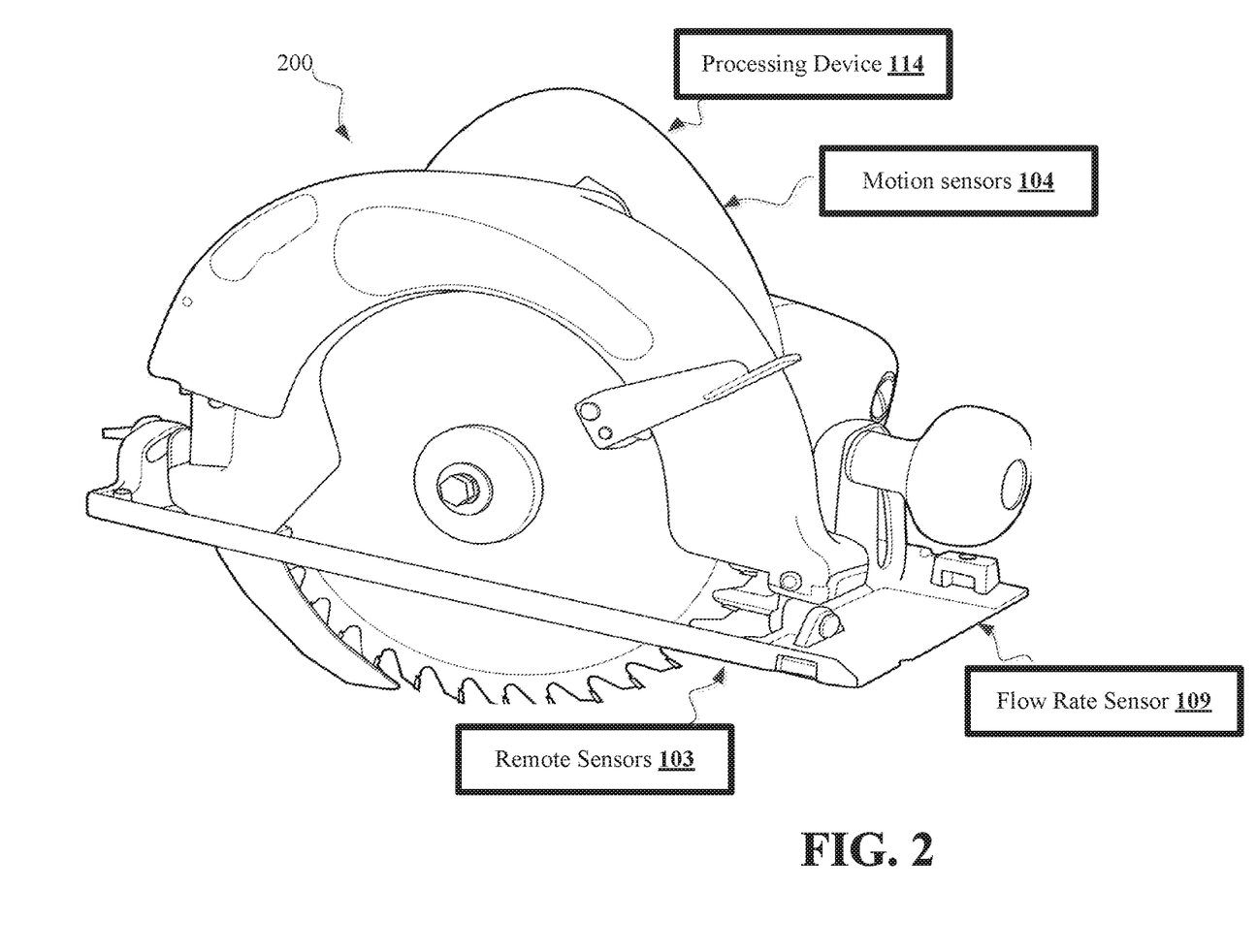
FIG. 2 illustrates an example power tool with sensors and a processing device of the abnormal motion detection system embedded into the tool.

Referring to FIG. 2, in some implementations, most of the abnormal detection system 100 can be consolidated on a power tool 200, e.g., a circular saw. As illustrated, the power tool 200 includes the processing device 114 and motion sensors 104 in its handle. Environment sensors for temperature, humidity, and a barometer can be mounted in the handle or other viable locations on the tool. Remote sensors 103 are placed near a chain or a motor of the power tool 200. One or more flow-rate sensors 109 and ranging sensor are mounted to the baseplate of the saw 200. The tool may have a look through hole in the baseplate to measure the X-Y-Z movement of the workpiece, where X-Y is the plane of the workpiece and Z is perpendicular to the plane. The sensors 103, 104, and 109 can communicate with the processing device 114 using wired or wireless communication.

In one embodiment of the invention a hand-held, battery-powered circular saw is used. A 9-axis IMU (Motion sensors [104]), a processor (Processing Device [114]), and a solid-state relay (Reactive Device [115]) are co-located on a printed circuit board inside the handle of said circular saw [200]. This embodiment of the present invention includes a novel application of the 3-axis magnetometer included in the IMU [104]. While the magnetometer's intended purpose is to sense the Earth's magnetic field, the present invention applies the magnetometer in a non-conventional manner to measure the real-time magnetic flux of the electric motor, which is proportional to the torque of the motor. Therefore, the Flow Rate Sensor [109] and Remote Sensors [103] are not required in this particular implementation. During normal operation of the circular saw, the processor [114] continually reads data from all 9 axes of the IMU [104] and passes the data through the machine learning model [112] which, in this case, is a pre-trained LSTM running a sequence-to-sequence time-series prediction and classification. At each 5 millisecond (ms) timestamp, a new sample, consisting of a single data point from each of the 9 axes of the IMU [104], is added to a pipeline of 10 sequential samples and the oldest sample is dropped. The LSTM is pre-trained to use the current ten samples to make a prediction of what the next sequence of 10 subsequent samples will be. A new pipeline buffer, or window, is therefore generated consisting of 20 samples—9 samples from the past, the single current sample, and 10 predicted samples into the future which represent a total of 100 milliseconds of time (50 ms in the past, 50 ms in the future). The output of the pre-trained LSTM network is a classifier which represents a probability between 0 and 1 that a kickback event is present within the 20 sample window (present and future samples). If the probability exceeds a certain threshold (which threshold is also known to the user as a sensitivity level and can be adjusted), the processor asserts a signal to the solid-state relay [115], which interrupts the manual trigger signal of the circular saw, causing power to be removed to the electric motor and the saw's built-in electronic brake to be engaged. Therefore, an imminent kickback event—one that is already happening or very likely to happen—may be predicted up to 50 milliseconds in advance, based on the context of current samples. The number of samples may be adjusted to increase the prediction window to as much as 200 milliseconds, but resulting in higher rates of false alarms. Thus, kickback events may be predicted and properly mitigated. Further details of elements used in this embodiment are discussed below.

In one implementation, the power tool 200 is a table saw that does not require motion sensors because the tool is stationary. The flowrate and ranging sensors look up and measure the workpiece moving over a table surface. These sensors are critical for detecting abnormal motion, e.g., kickback. The table saw may also include temperature, humidity, and remote sensors on the motor or blade to gather useful information.

Referring back to FIG. 1, in some implementations, the Bluetooth communication between the user's phone and the power tool allows the abnormal detection system 100 to understand the relation of the user to the power tool. For example, the system may be able to determine when the user is within a defined proximity of the power tool, allowing the tool to be locked in a safe state when the user is outside the defined proximity and unlocked and ready for use when the user is inside the defined proximity.

As illustrated in FIG. 1, in the system 100, sensor data is collected in real-time and processed by processing device 114, e.g., a microcontroller. The processing device 114 can include one or more of the following components: a memory 110 for storing sensor data, an environment sensor 106d for collecting information about the workspace 110 environment, wireless connectivity 117, a general purpose input/output 118, a battery 119, a battery charger 120, and a machine learning model 112 that is trained to determine abnormal motion of a power tool.

The sensor data, e.g., motion data from one or more sensors, can be sent wirelessly or using a wire to the processing device 114. In some implementations, the sensor data is collected using a sensor that is located on the same circuit board as the processing device 114. In other implementations, the system 100 relies on network capabilities of the sensors to send the data directly to the processing device 114. One or more environmental sensors 106d may be located on the power tool 105 and processed by the processing device 114.

Once the processing device 114 receives the sensor data, the processing device can store the data in memory 110. In some implementations, a memory controller 110 of the processing device 114 interfaces with each sensor to capture, time-synchronize, and store each measurement of the one or more sensors. The measurements can be stored in random access memory for rapid recovery during processing or in Flash memory for long-term storage. In some implementations, the processing device 114 collects, timestamps, and loads data from all sensors into short-term memory for further processing and, after processing, compresses and moves the sensor data to long-term memory.

During processing, e.g., digital signal processing, the processing device 114 processes the sensor data using filters and fusion algorithms. The system 100 uses filtering algorithms and methods to remove spurious or unnecessary noise from signal input streams. Filters may include: high and/or low-pass filtering or band-pass frequency filtering; applying known physical constraints of power tools, e.g., since a circular saw only moves forward and backwards while cutting, minor lateral motion can be filtered out; smoothing filters such as running averages or spline interpolation; predictive filters and dead-reckoning such as Kalman filters.

The processor 114 applies sensor fusion algorithms and methods to combine data from all motion sensors, constructing a complete characterization of the motion of the tool. All data is properly scaled, normalized and filtered. This process creates a unified frame for each time-step of sensed motion.

The abnormal motion detection system 100 uses the unified frame for each time-step of sensed motion as input to a machine learning model 112 of the processor 114 to determine whether motion from a power tool 105 is abnormal.

In some implementations, the machine learning model 112 is a neural network. Neural networks are machine learning models that employ one or more layers of neurons to generate an output, e.g., one or more classifications, for a received input. Neural networks may include one or more hidden layers in addition to an output layer. The output of each hidden layer can be used as input to the next layer of the network, i.e., the next hidden layer or the output layer, and connections can also bypass layers, or return within the same layer such as is the case in a recurrent network unit. Each layer of the neural network generates an output from its inputs in accordance with the network architecture and a respective set of parameters for the layer. In addition to typical weights and biases to be trained through customary practices such as but not limited to stochastic gradient descent, the network may include gates to hold memory as well as gates to remove data from memory such as in a Long Short-Term Memory (LSTM) network. A stateful network such as the LSTM aids in sequence classification and allows the network to understand the context of current data based on prior events. LSTM networks are also commonly used in the prediction or forecasting of future events, known to the practice as a sequence to sequence prediction.

The machine learning model 112 is trained to determine abnormal behavior for specific power tools. A data collection unit, e.g. a processing device 114, comprising of the same sensors as will be used in the abnormal motion detection system deployed in a workspace, is installed in a representative test system, e.g., a power tool 105. The test system collects data at the same sample rate in testing scenarios as it does when the abnormal motion detection system 100 is deployed and running in a non-testing mode. During testing, a user performs normal daily operations with a power tool and the system 100 in testing mode captures and stores the normal operating data. If no abnormal motion events occur, e.g., no kickbacks, the system 100 saves the dataset to a database, labeled as normal. This process is repeated with a representative sample of users performing a representative sample of daily operations with the tool. In addition, a 3D model of the tool and physics-based simulation may be used to generate synthetic training data for normal use.

To create a robust set of data for each tool, the system 100 in testing mode also generates a database of abnormal motion events for each tool. Since it is unsafe to request users to intentionally misuse a power tool, a test fixture is constructed to secure the tool and prevent injury. Abnormal motion is induced by intentionally creating an impingement of the cutting implement with the material to be cut.

As an example, a circular saw may be used to rip half-way down the length of a board, then pinched in a material using a clamp. The trigger is fastened in the on position such that when power is applied, the back edge of the blade immediately gains purchase on the board and causes the tool to jump from the board. Such a scenario is not 100% representative of a real-world event, but sufficient to train the neural network for the machine learning model 112. Additionally, a 3D physics-based simulator may also be programmed to generate synthetic data of a more representative real-world abnormal motion event.

The time-series data representing abnormal motion events are labeled and manually annotated with a timestamp of the exact event. For example, a time-series that includes a kickback event may be 250 ms with the actual kickback event occurring 150 ms into the time series. The entire time-series data of 250 ms can be labeled as representing abnormal motion with the actual event at 150 ms being labeled as the kickback event. This labelling process is done by manually inspecting the data and determining when the event occurred.

In some implementations, e.g., the case of test fixture events, inspection is aided by the use of time-synchronized video equipment. For synthesized events in simulation, manual inspection is not necessary as the time of the event is built into the simulation. Similarly, for "normal" use cases, no timestamp is necessary since abnormal motion did not occur.

Data from both normal use as well as abnormal motion events are then consolidated and split into two categories: training and testing. Generally, 60% to 80% of the data is used for training and the rest is reserved for testing the neural network of the machine learning model 112 during training. The machine learning model 112 is trained on the training data through techniques such as but not limited to stochastic gradient descent and back-propagation. Training the machine learning model of the abnormal detection system 100 with known normal motion as well as known abnormal motion of the power tool enables the model to more effectively detect the differences in normal and abnormal motion for individual power tools.

For example, in a 2015 study published by the International Journal of Occupational Safety and Ergonomics, Andrzej Dabrowski characterizes the total energy imparted to a chainsaw due to kickback while cutting wood of various hardness, moisture levels, and temperatures. It is assumed that for logistical and/or safety reasons, only a single plane of motion was studied. The total theoretical energy is given by the following equation $$E_P = \frac{J_s \times (\omega_s^2 - \omega_{s1}^2) + J_P \times \omega_s^2}{2} \ (J), \qquad \text{Equation (1)}$$

where JP=inertia of the chainsaw blade and supporting system, and JS=the inertia of engine and supporting system. Equation describes the total energy that could potentially be converted to linear or rotational kinetic energy of the full chainsaw assembly, causing the user to lose control of the system in a hazardous manner.

The total converted energy was measured using high-speed video to assess the linear and rotational movement during the event. Total converted energy is given as $$E_o = W_h + W_r (J), \qquad \text{Equation (3)}$$

Where Wh=horizontal movement energy, and Wr=rotary movement energy. Given these two equations, a coefficient (ko) is defined as the ratio of the total kickback energy to the maximum kinetic energy available from the moving engine and saw blade. ko is measured and compared under various test conditions and various test articles.

$$k_o = \frac{E_o}{E_p}, \qquad \text{Equation (2)}$$

During experiments, kickback energy and angle have been shown to be dependent on many factors, including wood fiber direction in relation to kerf as well as hardness, temperature, and moisture content. However, linear and rotational motion of the kickback is limited to a single plane. In a true scenario, rotational motion of the engine as well as blade would induce gyroscopic precession orthogonal to axis of rotation, which is relevant to the present invention. Measuring motion and rotation in less than 6 degrees of freedom eliminates at least one component of the total motion vector and attenuates or distorts the measurement proportionally. This attenuation or distortion emphasizes the need for full motion characterization.

The kickback angle in these experiments was measured to vary from 5 to 52 degrees, indicating that a predetermined threshold for rotational motion would be insufficient.

By testing the neural network of the machine learning model 112 periodically with data it has not seen during training, the performance of training may be monitored and expected performance on real-world data may be predicted.

Once the training is complete, (i.e., accuracy is sufficiently high and error (loss) is sufficiently low as measured on the test data over many training cycles), the weights, biases, and gates of the network are frozen and stored in a minimized, deployable version of the neural network 100. This frozen neural network of the machine learning model 112 is then implemented in software and or firmware on the embedded processor 114. The processor 114 can be mounted inside the tool or placed on the tool and in communication with data networks using wired or wireless technology.

After training, system 100 can use the frozen neural network of the machine learning model 112 on real-time data to determine abnormal motion in real-world scenarios. Once the system 100 is deployed to a workspace 110 and a power tool 105 has been enabled, the system collects sensor data in real-time from the power tool 105. The processing device 114 processes the collected sensor data into filtered, unified frame time-steps. The machine learning model 112 begins execution, i.e., inference, by accepting unified frames, i.e., the filtered sensor data that has been fused into unified frames for each time-step. Each unified frame shows the motion of the power tool for a time-step. In some implementations, the machine learning model 112 uses processing techniques to perform pattern matching and recognition of the three-dimensional motion to determine abnormal motion for a specific tool. The machine learning model outputs a decimal value between 0 and 1, representing a probability of abnormal motion. Based on user settings from the optional application in the mobile device 101, a threshold may be assigned a decimal value at which the reactive device 115 triggers.

During run-time, the embedded processor 114 runs a forward-pass inference through the neural network to make predictions on each real-time unified frame of sensor data wherein the predictions are comprised of a time sequence forecasting several timestamps into the future. If an abnormal motion event, such as kickback, is detected, whether determined to be true or a false alarm, the system can store the relevant data from the event in local memory 110. If the tool is re-enabled within a short period of time, the system can annotate the event as most likely a false alarm. Otherwise, the system can annotate the event as likely to be a true abnormal motion event and the system can request that the user describe the event in more detail via an optional mobile application running on the mobile device 101. The system can then transfer data from the tool to the application where it can be compressed and uploaded to a central repository.

The central repository is monitored in an offline process for trends in false alarms and specific scenarios that increase the risk of abnormal motion events. Neural network models can then be continually refined by retraining on additional real-world data as it is captured from the field and added to the repository. For example, anonymous time series data collected through use of the power tool can be transmitted using the mobile device running the mobile application for power tool safety to the central repository or directly to a remote deep-learning machine learning model, e.g., a cloud-based deep-learning model, and used to improve detection of future hazardous conditions. New versions of the neural network can be deployed to the system 100 in various means, e.g., using the mobile application connected to the power tool and at the user's option.

In some implementations, the abnormal motion detection system 100 includes a mobile application that can be used to authenticate and register power tool users, transfer ownership of power tools, alert the system to the user's position and/or location, monitor workspace conditions, predict outcomes from specific scenarios, and provide alerts to the user as well as others.

When a user obtains a power tool, the user may have the ability to use the mobile application to register him or herself as the power tool owner. The user may also have the ability to register the profiles of several other people as active users of the power tool. The mobile application can store information about several users for each power tool. The application can use the registration information to authenticate a specific user when the user wants to use the power tool. For example, during the registration process, the user may provide a password and register a mobile phone, when the system receives the correct password for the user and detects that the user's phone is in proximity to the registered power tool, the system may enable the power tool for the user's use.

The application can also send alerts to a user of a power tool if the system 100 senses that the power tool motion is becoming abnormal. Furthermore, the application can provide alerts to first responders or other emergency contacts when the system senses abnormal motion from a power tool that has become dangerous to the operator. Emergency contacts may be added during tool registration. First responder information may be pre-programmed or determined based on the user's current location. The mobile application also has the potential to bring co-workers or first-responders more rapidly to the rescue since the microcontroller running the pre-trained neural network may be Bluetooth and/or WIFI enabled. The controller can send an abnormal motion signal to a user's phone using Bluetooth or WIFI when the abnormal detection system 100 detects a problem.

In some implementations, the abnormal motion detection system can measure relative motion between the power tool and user. This may be performed with the use of a user-mounted sensor or suite of sensors as are commercially available, such as a smart headset and even an augmented reality headset comprising such sensors as depth cameras, inertial measurement units, and stereoscopic cameras. Example sensors include headsets which are inside-out augmented reality devices and provide real-time 6 degree-of-freedom pose and absolute position of the user's head as well as hand and finger location inside of a room or relative to static objects. Alternatively, the user-mounted sensor may comprise one or more depth cameras that provide stereoscopic imagery combined with a laser projector for a structured light visible plus depth (RGB-D) sensor. Alternatively, the user-mounted sensor may be comprised of one or more visible, infrared, or thermal camera including a trained deep neural network capable of detection hands, fingers, and human gestures from 2-dimensional streams of images.

Alternatively, relative motion between the user and the power tool may be performed with the use of a sensor fixed relative to the power tool. One or more of the sensing modalities described above maybe mounted in a static location relative to the power tool's hazardous surface to monitor the proximity of human appendages to hazardous surfaces of the power tool. Hazardous surfaces may include, but not be limited to any moveable or rotating surface capable of causing impingement, laceration, or amputation of any portion of the user's person.

Figure 3:
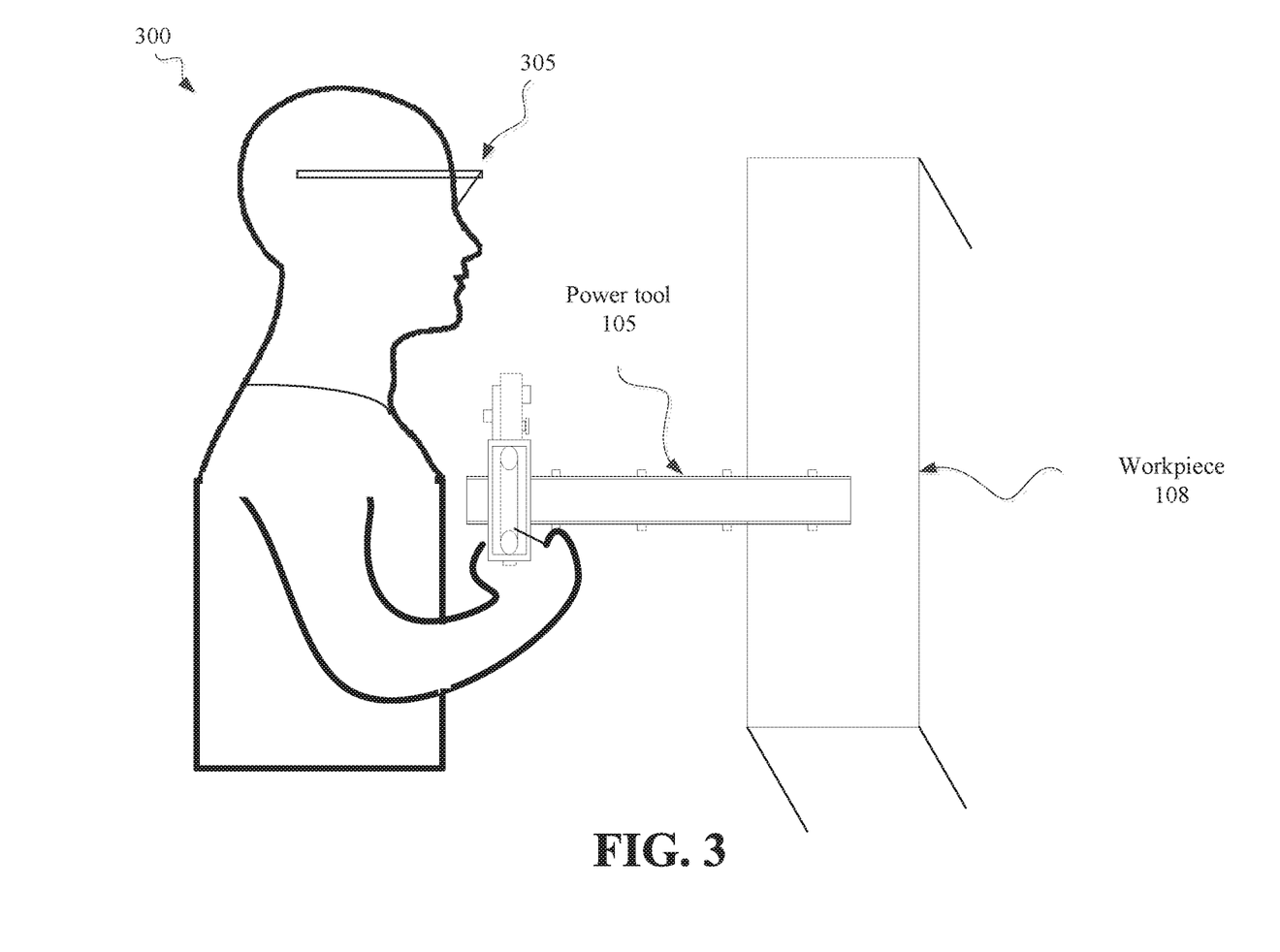
FIG. 3 illustrates an abnormal motion detection system that uses an smart headset to dynamically determine whether motion of a power tool in a workspace is abnormal

FIG. 3 shows an implementation in which an abnormal motion detection system 300 uses a smart headset 305 such as an inside-out Augmented Reality (AR) headset. The headset can run Simultaneous Localization and Mapping (SLAM) algorithms in the headset and may include one or more ranging sensors, stereoscopic camera, motion sensors, etc and can be used for hand gesture recognition and localization for determining relative position between the tool, user position, cutting implement and the workpiece. These sensors and algorithms allow the system 300 to calculate the total kinematic motion of the power tool 105. With the above information gathered from the headset, the system 300 can also trigger the reactive device 115 when the relative position of the user (including extremities) is within a predetermined keep-out zone of the implement, or approaching said keep-out zone at a velocity and proximity above a pre-determined threshold. Although simplified for clarity purposes, the abnormal motion detection system 300 may include all of the features of abnormal motion detection system 100 with the addition of an augmented reality headset 305. The headset 305 transmits its data over wireless connections to the tool's internal processing device 114 where it is processed with the other sensor data.

Figure 4:
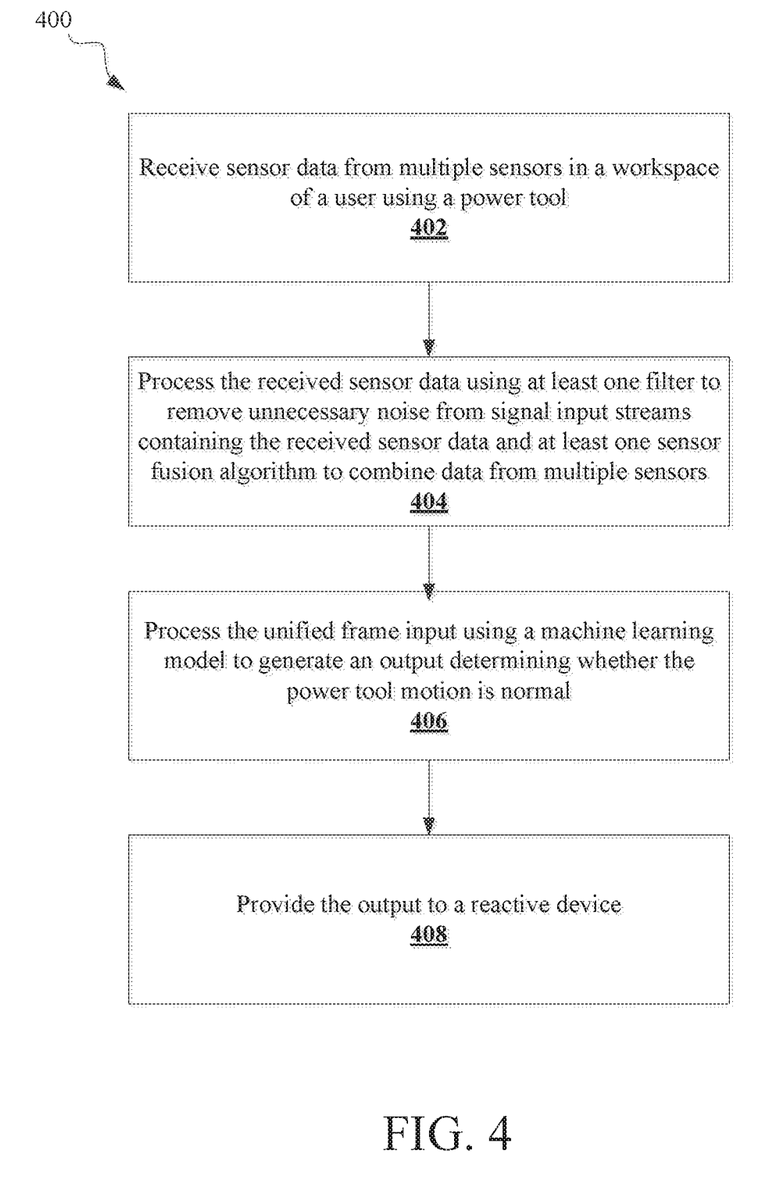
FIG. 4 illustrates an example flow diagram of an example process for dynamically determining abnormal motion of a power tool in a workspace.

FIG. 4 is a flowchart of an example process 400 for dynamically determining abnormal motion of a power tool in a workspace. For convenience, the process 400 will be described as being performed by a system of one or more computers, located in one or more locations, and programmed appropriately in accordance with this specification. For example, an abnormal motion detection system, e.g., the abnormal motion detection system 100 of FIG. 1, appropriately programmed, can perform the process 400.

The system 100 can first provide a power tool in a disabled mode until a registered user is present. The system 100 can determine whether a registered user is present by authentication using a mobile application running on the user's mobile device and/or any electronic active or passive wireless proximity device. During registration, the user can register a mobile phone. The system can use the strength of a Bluetooth signal to detect the proximity of the user's phone to the tool. When a registered user's phone is in close proximity to a power tool, i.e., the detected Bluetooth signal is strong, the system may enable the power tool. When the system detects a registered user in proximity of the tool, the system disables the lockout and allows the tool to be in a status for use.

The system 100 begins process 400 by receiving sensor data from multiple sensors in a workspace where the user is using the power tool. As described above, the sensors include sensors for measuring multiple aspects of power tool motion in three dimensions (402). The system may actively request sensor data from sensors or may passively receive sensor data, e.g., on timed intervals. In some implementations, the system stores the sensor data in memory, either short-term or long-term, prior to processing. The system then processes the received sensor data using at least one filter to remove unnecessary noise from signal input streams containing the received sensor data and at least one sensor fusion algorithm to combine data from multiple sensors into a unified frame for a given time stamp (404). In one implementation, all of the sensor data is collected by the sensor and sent to the processor 114 for further processing. The system provides the unified frame input to the pre-trained neural network of a machine learning model to generate an output determining whether the sensed power tool motion is normal (406). As described above, this inference process requires the machine learning model to extract and sort time series from the unified frames created from the sensor data. The system then compares extracted time series data with known, labelled data from power tools to determine whether the sensed motion is normal or abnormal for the given power tool and user. The machine learning model outputs a decimal value between 0 and 1, representing a probability of abnormal motion. Based on user settings from the optional application in the mobile device 101, a threshold may be assigned a decimal value at which the reactive device 408 triggers. The system then provides the output to a reactive device (408). Upon receiving information that a power tool's motion is abnormal, the reactive device can quickly mitigate the situation. In some implementations, the reactive device may stop or rapidly slow the cutting, grinding, or crushing implement, etc.

For example, when wood gets caught up in a table saw and begins accelerating towards the user, the system detects the hazard using sensors and the machine learning model as described above. The system then can send an output to the reactive device, e.g., a discrete logic signal or a serialized message to the controller of the reactive device to stop or significantly slow the energy transfer from the blade to the wood.

The system 100 can detect abnormal motion in many different types of power tools applying the same systems as described above. Minor variations with respect to a particular workpiece, cutting implement and sensors associated with a particular tool, such as the flow rate and ranging sensor, may be utilized.

For example, when using a hand-drill, the system expects a linear, plunging motion. If the drill catches in material, the rotational inertia of the motor and drill bit get transferred to the housing of the drill motor, causing the drill housing to spin uncontrollably. The abnormal motion detection system, as described, is capable of sensing the rotation of the motor (electromagnetically), the rotation of the housing (gyroscope), and lateral and vertical flow rate of the material (optical ranger and one or more flow-rate sensors).

When a kickback condition occurs, the rotation of the housing increases to match the rotation of the motor and the linear plunging motion stops. The system immediately senses the condition and sends a signal to the mitigating electric brake. In addition to stopping kickback, the system also provides precision measurements of plunge depth.

A sensing method for a drill press is equal but opposite to a hand drill. In a kickback condition, the rotation of the housing stays fixed, but the rotation rate of the workpiece increases to match the rotation (or tool). This condition is immediately sensed and a trigger is sent to the mitigating electric brake.

A reciprocating saw includes a saw blade that is thrust forward and back in a single plane of motion. If the blade becomes bound in the material, the body of the saw begins to reciprocate in the same plane, or the blade will "chatter" on the material, potentially ruining the workpiece. In this kickback condition, the sudden kinetic impulse is detected (using an accelerometer) as an aberration from the characteristic kinematic model. The distance between the housing and workpiece begins to oscillate and is detected (using a ranging sensor) and a trigger is sent to the mitigating electronic brake.

A table saw is a fixed tool where the electric motor and spinning blade are stationary and material is fed into the blade in a single, horizontal plane. A frequent kickback condition occurs when the material gets snagged while exiting the cutting area. The rotating blade picks up the material and flings it at a high rate of speed toward the operator. An optical flow rate sensor can be placed below the deck of the table saw, looking up at the material passing over it. Multiple flow rate sensors can be placed on the deck, near the entry of the cutting area, in the middle of the cutting area, and at the exit. Sensor can be placed on either side of the cutting blade.

While the saw is still in the process of cutting material, all sensors measure a similar flow rate. After cutting is complete, flow rate on either side of the blade may slow as the material is now discontinuous, but the flow rate should never reverse rapidly. If reverse motion is detected, the system immediately detects the hazard and sends a trigger to the mitigating device to slow or stop the motion of the saw thereby reducing or eliminating kinetic energy transfer between the blade and the workpiece. Additionally, as discussed above, the smart headset 305 monitors the relative position between the user, including all appendages (particularly hand and fingers), and the table saw blade. With the above information gathered from the headset, the system 100 can also trigger the reactive device 115 when the relative position of the user (including extremities) is within a predetermined keep-out zone of the implement, or approaching said keep-out zone at a velocity and proximity above a pre-determined threshold. This process is also used in the case of a mitre saw (chop saw) to lock out power to the saw when the relative position of the user (including extremities) is within a predetermined keep-out zone or the implement. As an alternative to the smart headset, one or more visual sensors may be placed in view of the cutting implement, and a neural network trained on hand and finger detection may detect the presence of human appendages within the predetermined keepout zone.

Similar to the table saw, a belt sander is fixed and material is fed into the tool in a single plane. When the material gets snagged on the belt or on the wrong side of the circular disk, the workpiece can be flung into the air. In this condition, the material flow immediately detects the motion away from the sanding plane and sends a trigger to the mitigating device to slow or stop the motion of the belt or disk.

In addition to the typical kickback danger of a grinding wheel, another hazardous condition occurs when a wheel is installed that is too big for the speed of the grinder. In this scenario the centrifugal forces on the disk exceed the tensile strength of the disk and it can fly apart, striking anything in the plane of rotation with tremendous force.

Similar to the Hall Effect sensor on the circular saw, an additional flow and ranging sensor would be placed on the body of the tool, sensing the flow at the max distance as well as the presence of a disc beyond the maximum radius allowed by the grinding wheel. If the disc is too big, or if a regular sized disc is found to be rotating too quickly, a trigger is sent to any mitigating device to warn the user, or lockout power to the grinder until the situation is remedied. This is in addition to sensing distance and flow rate of the workpiece relative to the grinder for kickback detection.

As previously described, a gas-powered chain saw has one of the highest vibration profiles of hand-held power tools. It also already has a chain brake system to stop the chain under certain conditions. There are several variations of the chain brake from various manufacturers, but all are mechanical and rely on either interference from the user (hitting a mechanical lever near the front or rear handle) or a significant inertial event to trip the brake.

While pruning a large tree trunk, the operator may rapidly rotate the chain saw up, down, and around all sides of the trunk. A skilled operator does this in a very quick motion, which, as demonstrated, would certainly trigger any basic thresholding approaches to sensing kickback. Additionally, there are more degrees of freedom in which kickback occurs. This is due to the very long blade and short radius on the tip of the saw blade. The chain can get caught on any surface of the blade and transfer a very a large amount of kinetic energy to the user.

In a typical kickback scenario, the saw is held horizontally with the chain blade spinning in a vertical plane. When the upper front tip (referred to as the kickback corner) of the saw gets snagged, the blade is forced vertically in the same plane of rotation as the chain. Typical "automatic" inertial brakes trip most easily in this vertical plane as gravity helps to trigger the brake. However, the user may occasionally choose to rotate the saw in any horizontal or vertical orientation. Though it is discouraged, tree pruners often work overhead with the saw in one hand. A common kickback scenario in this orientation is called "climbing kickback". The saw is oriented vertically on a vertical tree trunk during pruning when the bottom edge of the saw gets snagged and the saw "climbs" the trunk very near the operator's face. Inertial brakes are least effective in this dangerous vertical orientation.

In the absence of an electric motor, an additional sensor may be required to measure the mechanical motion of the combustion engine in order for it to be subtracted from the motion sensed by the primary motion sensors. Also, an electromechanical actuator to trigger the mechanical inertial brake may be required.

By rejecting the inherent vibration noise of the machine, measuring the full kinematic motion, and monitoring relative flow between saw and material, abnormal motion can be detected in any orientation, even in the most challenging of applications. With advanced signal processing and machine learning, not only can the noise be rejected, but the motion models for the system can be refined over time to continually improve false alarm rates.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A multi-dimensional kickback detection system for a power tool comprising:
   a three-axes accelerometer sensor;
   a three-axes gyroscope sensor;

a three-axes magnetometer measuring the magnetic flux of an electric motor of the power tool; and a processor comprising a machine learning model pre-trained for the power tool to predict an occurrence of a kickback event of the power tool, the machine learning model using data received from the accelerometer, gyroscope, and magnetometer to predict an occurrence of the kickback event, wherein the processor activates a reactive device of the power tool upon prediction of the kickback event.

2. The kickback detection system of claim 1, further comprising one or more flow-rate sensors and one or more ranging sensors for quantifying relative motion between the power tool and a workpiece and wherein the machine learning model additionally uses one or more flow-rate sensors and ranging sensor data to determine whether motion of the power tool represents imminent kickback.

3. The kickback detection system of claim 1, further comprising one or more sensors positioned on the user and/or tool that measures relative motion between the power tool and user.

4. The kickback detection system of claim 1, wherein a sequence data is used to predict subsequent sequence data within a future time period and classifying each data point of the future sequence as a kickback event or not a kickback event.

5. The kickback system of claim 4, wherein the future time period is 0-50 ms.

6. The kickback detection system of claim 4, wherein the machine learning model is a recurrent neural network.

7. The kickback detection system of claim 1, wherein when the kickback event is predicted, sequence data associated with the predicted kickback event is stored in a memory device.

8. The kickback detection system of claim 7, wherein the stored sequence data is transmitted from the power tool to a cloud-based deep-learning machine learning model and used to improve detection of future kickback events.

9. A method for determining a kickback event in a power tool, comprising:
   receiving sensor data from multiple sensors of the power tool, the sensor data including data from measuring motion of the power tool in three dimensions and also the magnetic flux of an electric motor of the power tool;
   processing the sensor data using a pre-trained machine learning model trained for the power tool, the machine learning model using a sequence of the sensor data to predict an occurrence of the kickback event; and
   providing the output to a reactive device to engage the reactive device upon determination of a kickback event.

10. The method of claim 9 further comprising the step of predicting future sequence data within a future time period by using previous and current sequences of the sensor data and classifying each data point of the future sequence as a kickback event or not a kickback event.

11. The method of claim 10, wherein the machine learning model is a recurrent neural network.

12. A power tool comprising:
   a motor that drives an output element;
   a reactive device that stops, slows, or inhibits the output element and/or motor;
   a three-axis accelerometer sensor;
   a three-axis gyroscope sensor;
   a three-axes magnetometer measuring the magnetic flux of an electric motor of the power tool; and
   a processor comprising a machine learning model pre-trained for the power tool to predict an occurrence of a kickback event of the power tool, wherein the machine learning model uses a sequence of data received from the accelerometer, gyroscope, and magnetometer of the power tool to predict an occurrence of the kickback event,
   wherein the processor activates a reactive device of the power tool upon prediction of the kickback event.

13. The power tool of claim 12, wherein the processor uses the sequence data to predict subsequent sequence data within a future time period and classifying each data point of the future sequence as a kickback event or not a kickback event.

* * * * *